US012775859B2

(12) United States Patent
Niroula et al.

(10) Patent No.: US 12,775,859 B2
(45) Date of Patent: Oct. 27, 2026

(54) ACCELERATED MOLECULAR DYNAMICS SIMULATION METHOD ON A QUANTUM-CLASSICAL HYBRID COMPUTING SYSTEM

(71) Applicants: IONQ, INC., College Park, MD (US); University of Maryland, College Park, MD (US)

(72) Inventors: Pradeep Niroula, College Park, MD (US); Yunseong Nam, North Bethesda, MD (US)

(73) Assignees: IONQ, INC., College Park, MD (US); UNITED STATES DEPARTMENT OF ENERGY, DC (US)

(*) Notice: Subject to any disclaimer, the term of this patent is extended or adjusted under 35 U.S.C. 154(b) by 1086 days.

(21) Appl. No.: 17/841,511

(22) Filed: Jun. 15, 2022

(65) Prior Publication Data

US 2022/0414513 A1 Dec. 29, 2022

Related U.S. Application Data

(60) Provisional application No. 63/214,200, filed on Jun. 23, 2021.

(51) Int. Cl.
*G06N 10/20* (2022.01)
*G06N 10/80* (2022.01)

(52) U.S. Cl.
CPC ............. *G06N 10/20* (2022.01); *G06N 10/80* (2022.01)

(58) Field of Classification Search
None
See application file for complete search history.

(56) References Cited

U.S. PATENT DOCUMENTS 8,788,450 B2 * 7/2014 Ulyanov ............ G05B 13/0295 706/62
2005/0273306 A1 12/2005 Hilton et al.
(Continued)

FOREIGN PATENT DOCUMENTS

CN 112567396 A 3/2021
JP 2021504831 A 2/2021
(Continued)

OTHER PUBLICATIONS

Ollitrault, Pauline J., Alexander Miessen, and Ivano Tavernelli. "Molecular quantum dynamics: A quantum computing perspective." Accounts of Chemical Research 54.23 (2021): 4229-4238. (Year: 2021).*

(Continued)

*Primary Examiner* — Renee D Chavez
(74) *Attorney, Agent, or Firm* — Patterson + Sheridan, LLP

(57) ABSTRACT

A method of performing computation using a hybrid quantum-classical computing system comprising a classical computer, a system controller, and a quantum processor includes identifying, by use of the classical computer, a molecular dynamics system to be simulated, computing, by use of the classical computer, multiple energies associated with particles of the molecular dynamics system as part of the simulation, based on the Ewald summation method, the computing of the multiple energies comprising partially offloading the computing of the multiple energies to the quantum processor, and outputting, by use of the classical computer, a physical behavior of the molecular dynamics system determined from the computed multiple energies.

14 Claims, 7 Drawing Sheets

(56) References Cited

U.S. PATENT DOCUMENTS

| | | | | |
|---|---|---|---|---|
| 2007/0239366 | A1 | 10/2007 | Hilton et al. | |
| 2020/0005178 | A1* | 1/2020 | Amini | G06F 1/20 |
| 2020/0026551 | A1* | 1/2020 | Ducore | G06F 15/80 |

FOREIGN PATENT DOCUMENTS

| | | | | |
|---|---|---|---|---|
| WO | 2005122052 | A1 | 12/2005 | |
| WO | 2020228238 | A1 | 11/2020 | |
| WO | WO-2020227825 | A1 * | 11/2020 | G06N 10/80 |

OTHER PUBLICATIONS

Wells, Brad A., and Alan L. Chaffee. "Ewald summation for molecular simulations." Journal of chemical theory and computation 11.8 (2015): 3684-3695. (Year: 2015).*

Bauer, Bela, et al. "Quantum algorithms for quantum chemistry and quantum materials science." Chemical reviews 120.22 (2020): 12685-12717. (Year: 2020).*

Bruzewicz, Colin D., et al. "Trapped-ion quantum computing: Progress and challenges." Applied physics reviews 6.2 (2019). (Year: 2019).*

International Search Report dated Oct. 25, 2022 for Application No. PCT/US2022/034082.

Sarah Harris et al. "Quantum-Assisted Biomolecular Modelling", Arxiv.Org, Cornell University Library, 201 Olin Library Cornell University Ithaca, NY 14853, Jul. 12, 2010, XP080487889.

Wells Brad A. et al. "Ewald Summation for Molecular Simulations", Journal of Chemical Theory and Computation: JCTC, vol. 11, No. 8, Aug. 3, 2015. pp. 3684-3695, XP055970280.

Gruber M E et al. "A Fast Fourier Transform Accelerated Ewald Summation Techniqu for the Vector Electromagnetic Rectanglar Cavity Green's Function", Journal of Computational Physics, London, GB vol. 280, Oct. 13, 2014 pp. 570-578. XP029091537.

Sheng-Chun Yang et al. "The ENUF Method—Ewald Summation based on Non-Uniform Fast Fourier Transform: Implementation, Parallelization, and Application", arxiv.org, Cornell University Library, 201 Olin Library Cornell University Ithaca, NY 14853. Apr. 26, 2020.

Bela Bauer et al. Quantum Algorithms for Quantum Chemistry and Quantum Materials Science, arxiv,org, Cornell University Library, 201 Olin Library Cornell University Ithaca, NY 14853. Jul. 11, 2020, XP081705177.

Bruzewicz Colin D. et al. "Trapped-ion Quantum Computing: Progress and Challenges", Applied Physics Reviews, vol. 6, No. 2, Apr. 8, 2019 p. 021314.XP055798038.

Balbuena, P. B., Johnston, K. P., & Rossky, P. J. (1996). Molecular Dynamics Simulation of Electrolyte Solutions in Ambient and Supercritical Water. 1. Ion Solvation. The Journal of Physical Chemistry, 100(7). https://doi.org/10.1021/ip9521940.

Brodholt, J. P. (1998). Molecular dynamics simulations of aqueous NaCl solutions at high pressures and temperatures. Chemical Geology, 151(1-4). https://doi.org/10.1016/S0009-2541(98)00066-7.

Cooley, J. W., & Tukey, J. W. (1965). An algorithm for the machine calculation of complex Fourier series. Mathematics of Computation, 19(90). https://doi.org/10.1090/S0025-5718-1965-0178586-1.

Kohlmeyer, A., & Vermaas, J. (2017). akohlmey/topotools: Release 1.7. http://dx.doi.org/10.5281/zenodo.545655.

Kremer, K., Robbins, M. O., & Grest, G. S. (1986). Phase Diagram of Yukawa Systems: Model for Charge-Stabilized Colloids. Physical Review Letters, 57(21). https://doi.org/10.1103/PhysRevLett.57.2694.

Quane, D. (1970). Crystal lattice energy and the Madelung constant. Journal of Chemical Education, 47(5). https://doi.org/10.1021/ed047p396.

European Application No. 22754590.2, Office Action dated Mar. 4, 2025, 6 pages.

Sarah Harris et al., Quantum-assisted biomolecular modelling, School of Phsics and Astronomy, University of Leeds, arXiv:1007.1885v1 [quant-ph] Jul. 12, 2010, 12 pages.

Japanese Patent Application No. 2023-578783, Notice for Reasons for Refusal dated Dec. 13, 2024, 8 pages.

Chinese Office Action for Application No. CN 202280045279.8 dated Apr. 30, 2026.

* cited by examiner

ACCELERATED MOLECULAR DYNAMICS SIMULATION METHOD ON A QUANTUM-CLASSICAL HYBRID COMPUTING SYSTEM

CROSS-REFERENCE TO RELATED APPLICATIONS

This application claims the benefit to U.S. Provisional Application No. 63/214,200, filed Jun. 23, 2021, which is incorporated by reference herein.

BACKGROUND

Field

The present disclosure generally relates to a method of performing computations in a hybrid computing system, and more specifically, to a method of obtaining energies of a physical system having interacting particles by molecular dynamics (MD) simulations performed in a hybrid computing system that includes a classical computer and quantum computer, where the quantum computer operates based on a group of trapped ions and the hybrid computing system can be referred to as a hybrid quantum-classical computing system.

Description of the Related Art

In quantum computing, quantum bits or qubits, which are analogous to bits representing a “0” and a “1” in a classical (digital) computer, are required to be prepared, manipulated, and measured (read-out) with near perfect control during a computation or computation process. Imperfect control of the qubits leads to errors that can accumulate over the computation process, limiting the size of a quantum computer that can perform reliable computations.

Among the types of physical systems or qubit technologies upon which it is proposed to build large-scale quantum computers, is a group of ions (e.g., charged atoms), which are trapped and suspended in vacuum by electromagnetic fields. The ions have internal hyperfine states which are separated by frequencies in the several GHz range and can be used as the computational states of a qubit (referred to as “qubit states”). These hyperfine states can be controlled using radiation provided from a laser, or sometimes referred to herein as the interaction with laser beams. The ions can be cooled to near their motional ground states using such laser interactions. The ions can also be optically pumped to one of the two hyperfine states with high accuracy (preparation of qubits), manipulated between the two hyperfine states (single-qubit gate operations) by laser beams, and their internal hyperfine states detected by fluorescence upon application of a resonant laser beam (read-out of qubits). A pair of ions can be controllably entangled (two-qubit gate operations) by qubit-state dependent force using laser pulses that couple the ions to the collective motional modes of a group of trapped ions, which arise from their Coulombic interaction between the ions. In general, entanglement occurs when pairs or groups of ions (or particles) are generated, interact, or share spatial proximity in ways such that the quantum state of each ion cannot be described independently of the quantum state of the others, even when the ions are separated by a large distance.

Quantum computers have been shown to improve the performance of certain computational tasks when compared to what classical computers can do, including simulations of physical systems. In molecular dynamics (MD) simulations of interacting particle N, inter-particle interaction energies, including long-range interactions, are calculated. This leads to the computational complexity (i.e., the number of computational steps in the simulations) that scales as $O(N^2)$ as the number of interacting particle N increases. Even when an efficient method is used, such as the Ewald summation method, the computational complexity in calculating the long-range interactions scales as $O(N^{3/2})$.

Therefore, there is a need for alleviating the computational complexity in MD simulations, in particular in an efficient method for MD simulation, such as the Ewald summation method.

SUMMARY

Embodiments of the present disclosure provide a method of performing computation using a hybrid quantum-classical computing system comprising a classical computer, a system controller, and a quantum processor. The method includes identifying, by use of the classical computer, a molecular dynamics system to be simulated, computing, by use of the classical computer, multiple energies associated with particles of the molecular dynamics system as part of the simulation, based on the Ewald summation method, the computing of the multiple energies comprising partially offloading the computing of the multiple energies to the quantum processor, and outputting, by use of the classical computer, a physical behavior of the molecular dynamics system determined from the computed multiple energies.

Embodiments of the present disclosure also provide a hybrid quantum-classical computing system. The hybrid quantum-classical computing system includes a quantum processor comprising a first register formed of a plurality of qubits, a second register formed of a plurality of qubits, and a third register formed of a plurality of qubits, each qubit comprising a trapped ion having two hyperfine states, one or more lasers configured to emit a laser beam, which is provided to trapped ions in the quantum processor, a classical computer configured to perform operations, and a system controller configured to execute a control program to control the one or more lasers to perform operations on the quantum processor based on the offloaded computing of the multiple energies. The operations include identifying, by use of the classical computer, a molecular dynamics system to be simulated, computing, by use of the classical computer, multiple energies associated with particles of the molecular dynamics system as part of the simulation, based on the Ewald summation method, the computing of the multiple energies comprising partially offloading the computing of the multiple energies to the quantum processor, and outputting, by use of the classical computer, a physical behavior of the molecular dynamics system determined from the computed multiple energies.

Embodiments of the present disclosure further provide a hybrid quantum-classical computing system. The hybrid quantum-classical computing system includes a classical computer, a quantum processor comprising a first register formed of a plurality of qubits, a second register formed of a plurality of qubits, and a third register formed of a plurality of qubits, each qubit comprising a trapped ion having two hyperfine states, non-volatile memory having a number of instructions stored therein which, when executed by one or more processors, causes the hybrid quantum-classical computing system to perform operations, and a system controller configured to execute a control program to control the one or more lasers to perform operations on the quantum processor based on the offloaded computing of the multiple energies. The operations include identifying, by use of the classical computer, a molecular dynamics system to be simulated, computing, by use of the classical computer, multiple energies associated with particles of the molecular dynamics system as part of the simulation, based on the Ewald summation method, the computing of the multiple energies comprising partially offloading the computing of the multiple energies to the quantum processor, and outputting, by use of the classical computer, a physical behavior of the molecular dynamics system determined from the computed multiple energies.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
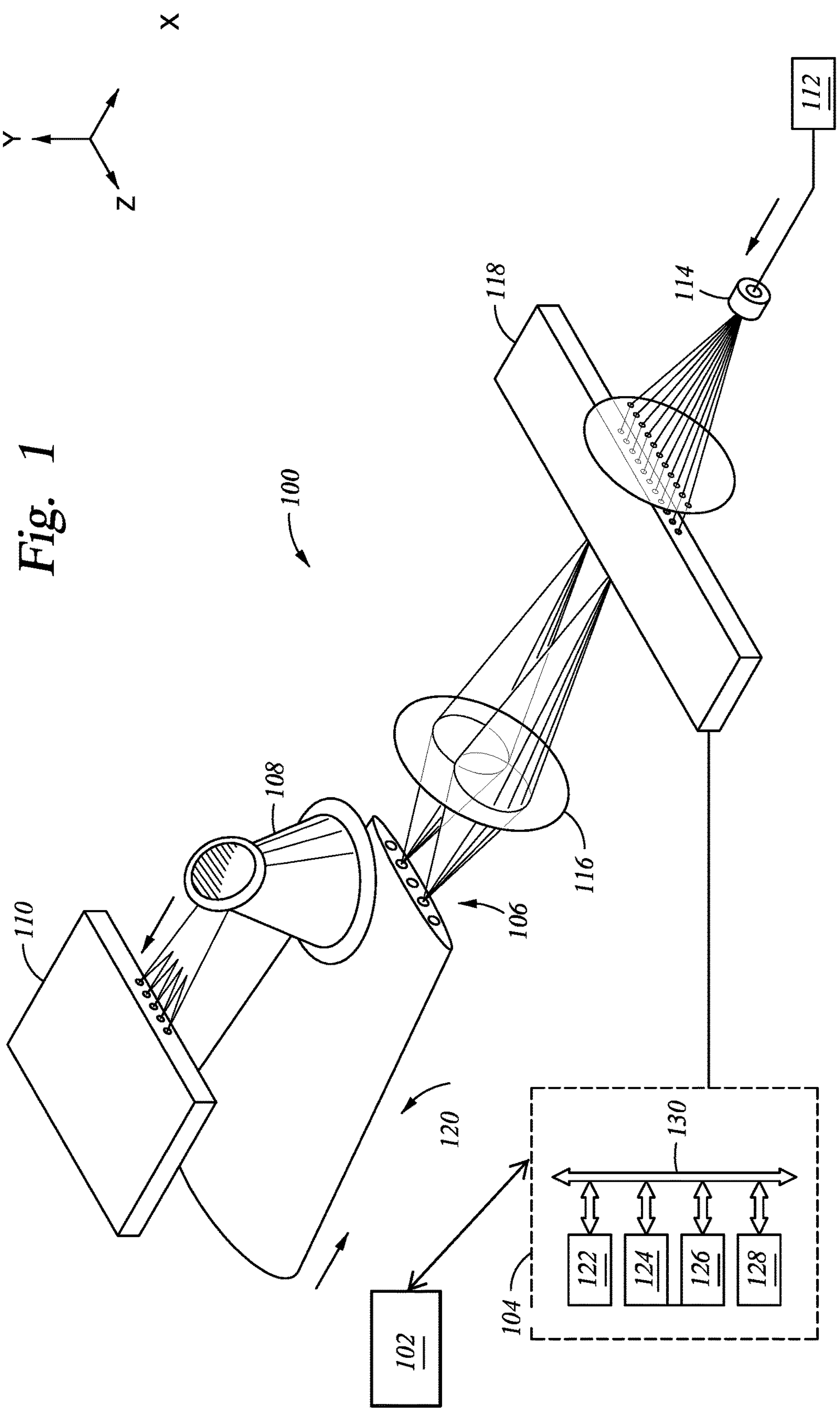
FIG. 1 is a schematic partial view of an ion trap quantum computing system according to one embodiment.

To facilitate understanding, identical reference numerals have been used, where possible, to designate identical elements that are common to the figures. In the figures and the following description, an orthogonal coordinate system including an X-axis, a Y-axis, and a Z-axis is used. The directions represented by the arrows in the drawing are assumed to be positive directions for convenience. It is contemplated that elements disclosed in some embodiments may be beneficially utilized on other implementations without specific recitation.

DETAILED DESCRIPTION

Embodiments described herein are generally related to a method of performing computation in a hybrid computing system, and more specifically, to a method of obtaining energies of a physical system having interacting particles by molecular dynamics (MD) simulations performed in a hybrid computing system that includes a classical computer and quantum computer, where the quantum computer operates based on a group of trapped ions and the hybrid computing system can be referred to as a hybrid quantum-classical computing system.

A hybrid quantum-classical computing system that is able to obtain inter-particle interaction energies of a physical system having interacting particles by molecular dynamics (MD) simulations may include a classical computer, a system controller, and a quantum processor. As used herein, the terms "quantum computer" and "quantum processor" may be used interchangeably to refer to the hardware/software components that perform a quantum computation. A hybrid quantum-classical computing system performs supporting tasks including selecting a physical system including a group of interacting particles to be simulated by use of a user interface, and computing a part of the inter-particle interaction energies of the physical system, by the classical computer, system control tasks including transforming a series of logic gates into laser pulses and applying them to the quantum processor and performing measurements to estimate the remaining part of the inter-particle interaction energies of the physical system, by the system controller, and further supporting tasks including totaling the inter-particle interaction energies of the physical system, by the classical computer. A software program for performing the tasks is stored in a non-volatile memory within the classical computer.

The quantum processor can be made from different qubit technologies. In one example, for ion trap technologies, the quantum processor includes trapped ions that are coupled with various hardware, including lasers to manipulate internal hyperfine states (qubit states) of the trapped ions and photomultiplier tubes (PMTs), or other type of imaging devices, to read-out the internal hyperfine states (qubit states) of the trapped ions. The system controller receives from the classical computer instructions for controlling the quantum processor, and controls various hardware associated with controlling any and all aspects used to run the instructions for controlling the quantum processor. The system controller also returns a read-out of the quantum processor and thus output of results of the computation(s) performed by the quantum processor to the classical computer.

The methods and systems described herein include a computer simulation routine executed by the quantum processor, within a hybrid quantum-classical computing system, to perform computer simulation of a complex system, such as complex physical systems including but not limited to molecular dynamics. The methods described herein include improvements over conventional computer simulation methods.

General Hardware Configurations

FIG. 1 is a schematic partial view of an ion trap quantum computing system 100, or simply the system 100 according to one embodiment. The system 100 can be representative of a hybrid quantum-classical computing system. The system 100 includes a classical (digital) computer 102 and a system controller 104. Other components of the system 100 shown in FIG. 1 are associated with a quantum processor, including a group 106 of trapped ions (i.e., five shown as circles about equally spaced from each other) that extend along the Z-axis. Each ion in the group 106 of trapped ions is an ion having a nuclear spin I and an electron spin s such that the difference between the nuclear spin I and the electron spin s is zero, such as a positive ytterbium ion, $^{171}Yb^+$ a positive barium ion $^{133}Ba^+$, a positive cadmium ion $^{111}Cd^+$ or $^{113}Cd^+$, which all have a nuclear spin I=½ and the $^2S_{1/2}$ hyperfine states. In some embodiments, all ions in the group 106 of trapped ions are the same species and isotope (e.g., $^{171}Yb^+$) In some other embodiments, the group 106 of trapped ions includes one or more species or isotopes (e.g., some ions are $^{171}Yb^+$ and some other ions are $^{133}Ba^+$). In yet additional embodiments, the group 106 of trapped ions may include various isotopes of the same species (e.g., different isotopes of Yb, different isotopes of Ba). The ions in the group 106 of trapped ions are individually addressed with separate laser beams. The classical computer 102 includes a central processing unit (CPU), memory, and support circuits (or I/O) (not shown). The memory is connected to the CPU, and may be one or more of a readily available memory, such as a read-only memory (ROM), a random access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 108, such as an objective lens with a numerical aperture (NA), for example, of 0.37, collects fluorescence along the Y-axis from the ions and maps each ion onto a multi-channel photo-multiplier tube (PMT) 110 (or some other imaging device) for measurement of individual ions. Raman laser beams from a laser 112, which are provided along the X-axis, perform operations on the ions. A diffractive beam splitter 114 creates an array of Raman laser beams 116 that are individually switched using a multi-channel acousto-optic modulator (AOM) 118. The AOM 118 is configured to selectively act on individual ions by individually controlling emission of the Raman laser beams 116. A global Raman laser beam 120, which is non-copropagating to the Raman laser beams 116, illuminates all ions at once from a different direction. In some embodiments, rather than a single global Raman laser beam 120, individual Raman laser beams (not shown) can be used to each illuminate individual ions. The system controller (also referred to as an "RF controller") 104 controls the AOM 118 and thus controls intensities, timings, and phases of laser pulses to be applied to trapped ions in the group 106 of trapped ions. The CPU 122 is a processor of the system controller 104. The ROM 124 stores various programs and the RAM 126 is the working memory for various programs and data. The storage unit 128 includes a nonvolatile memory, such as a hard disk drive (HDD) or a flash memory, and stores various programs even if power is turned off. The CPU 122, the ROM 124, the RAM 126, and the storage unit 128 are interconnected via a bus 130. The system controller 104 executes a control program which is stored in the ROM 124 or the storage unit 128 and uses the RAM 126 as a working area. The control program will include software applications that include program code that may be executed by the CPU 122 in order to perform various functionalities associated with receiving and analyzing data and controlling any and all aspects of the methods and hardware used to implement and operate the ion trap quantum computing system 100 discussed herein.

Figure 2:
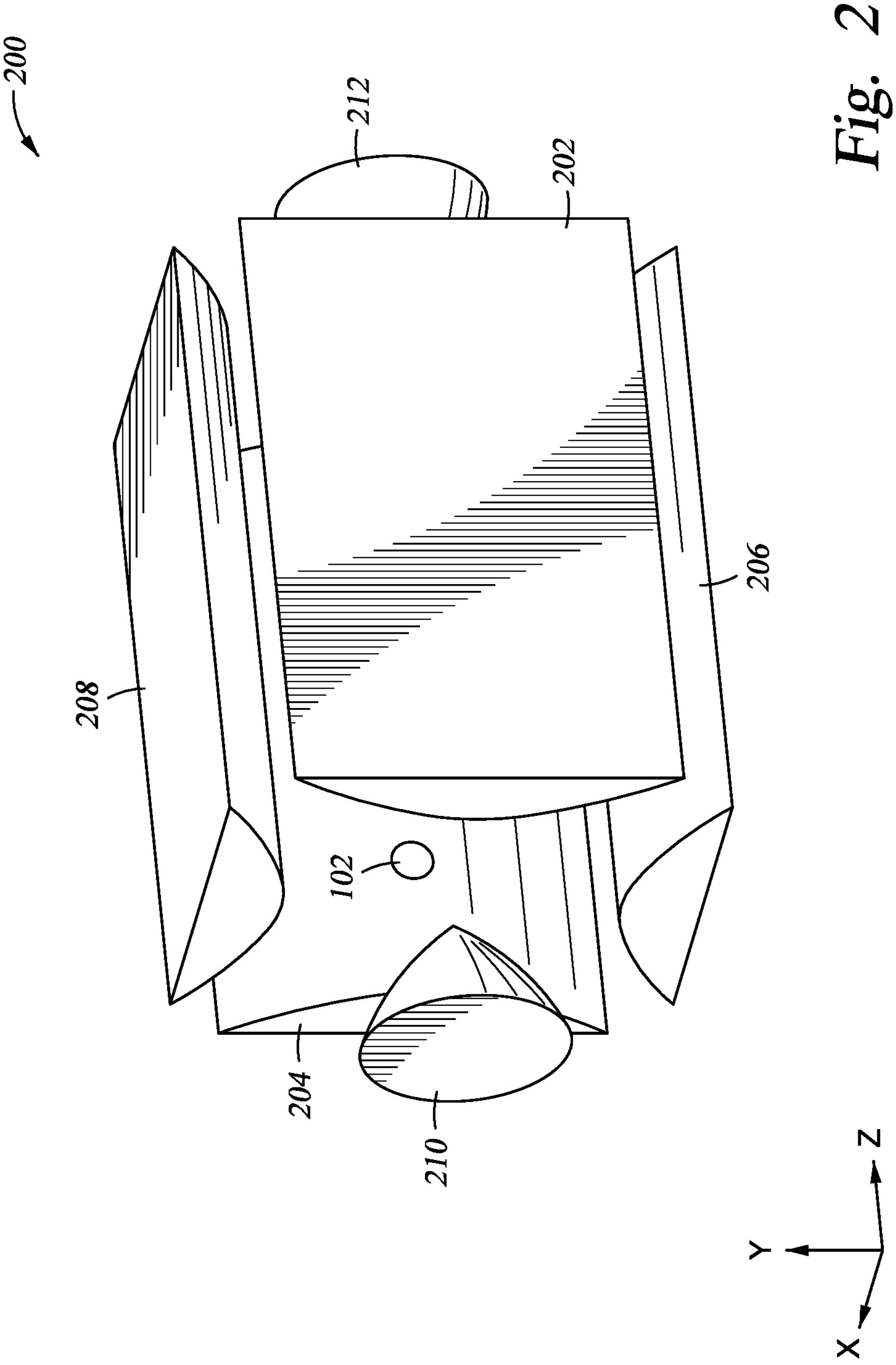
FIG. 2 depicts a schematic view of an ion trap for confining ions in a group according to one embodiment.

FIG. 2 depicts a schematic view of an ion trap 200 (also referred to as a Paul trap) for confining ions in the group 106 according to one embodiment. The confining potential is exerted by both static (DC) voltage and radio frequency (RF) voltages. A static (DC) voltage Vs is applied to end-cap electrodes 210 and 212 to confine the ions along the Z-axis (also referred to as an "axial direction" or a "longitudinal direction"). The ions in the group 106 are nearly evenly distributed in the axial direction due to the Coulomb interaction between the ions. In some embodiments, the ion trap 200 includes four hyperbolically-shaped electrodes 202, 204, 206, and 208 extending along the Z-axis.

During operation, a sinusoidal voltage $V_1$ (with an amplitude $V_{RF}/2$) is applied to an opposing pair of the electrodes 202, 204 and a sinusoidal voltage $V_2$ with a phase shift of 180° from the sinusoidal voltage $V_1$ (and the amplitude $V_{RF}/2$) is applied to the other opposing pair of the electrodes 206, 208 at a driving frequency $\omega_{RF}$, generating a quadrupole potential. In some embodiments, a sinusoidal voltage is only applied to one opposing pair of the electrodes 202, 204, and the other opposing pair 206, 208 is grounded. The quadrupole potential creates an effective confining force in the X-Y plane perpendicular to the Z-axis (also referred to as a "radial direction" or "transverse direction") for each of the trapped ions, which is proportional to a distance from a saddle point (i.e., a position in the axial direction (Z-direction)) at which the RF electric field vanishes. The motion in the radial direction (i.e., direction in the X-Y plane) of each ion is approximated as a harmonic oscillation (referred to as secular motion) with a restoring force towards the saddle point in the radial direction and can be modeled by spring constants $k_x$ and $k_y$, respectively. In some embodiments, the spring constants in the radial direction are modeled as equal when the quadrupole potential is symmetric in the radial direction. However, undesirably in some cases, the motion of the ions in the radial direction may be distorted due to some asymmetry in the physical trap configuration, a small DC patch potential due to inhomogeneity of a surface of the electrodes, or the like and due to these and other external sources of distortion the ions may lie off-center from the saddle points.

Although not shown, a different type of trap is a micro-fabricated trap chip in which a similar approach as the one described above is used to hold or confine ions or atoms in place above a surface of the micro-fabricated trap chip. Laser beams, such as the Raman laser beams described above, can be applied to the ions or atoms as they sit just above the surface.

Figure 3:
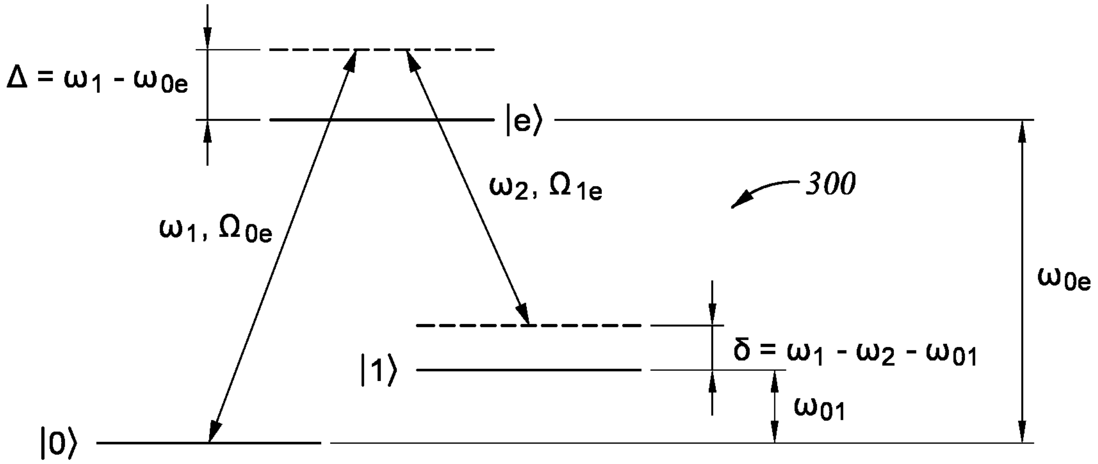
FIG. 3 depicts a schematic energy diagram of each ion in a group of trapped ions according to one embodiment.

FIG. 3 depicts a schematic energy diagram 300 of each ion in the group 106 of trapped ions according to one embodiment. Each ion in the group 106 of trapped ions is an ion having a nuclear spin I and an electron spin s such that a difference between the nuclear spin I and the electron spin s is zero. In one example, each ion may be a positive Ytterbium ion, $^{71}Yb^+$, which has a nuclear spin I=½ and the $^2S_{1/2}$ hyperfine states (i.e., two electronic states) with an energy split corresponding to a frequency difference (referred to as a "carrier frequency") of $\omega_{01}/2\pi$=12.642812 GHz. In other examples, each ion may be a positive barium ion $^{33}Ba^+$, a positive cadmium ion $^{111}Cd^+$ or $m^{13}Cd^+$, which all have a nuclear spin I=½ and the $^2S_{1/2}$ hyperfine states. A qubit is formed with the two hyperfine states, denoted as $|0\rangle$ and $|1\rangle$, where the hyperfine ground state (i.e., the lower energy state of the $^2S_{1/2}$ hyperfine states) is chosen to represent $|0\rangle$. Hereinafter, the terms "hyperfine states," "internal hyperfine states," and "qubits" may be interchangeably used to represent $|0\rangle$ and $|1\rangle$. Each ion may be cooled (i.e., kinetic energy of the ion may be reduced) to near the motional ground state $|0\rangle_m$ for any motional mode m with no phonon excitation (i.e., $n_{ph}$=0) by known laser cooling methods, such as Doppler cooling or resolved sideband cooling, and then the qubit state prepared in the hyperfine ground state $|0\rangle$ by optical pumping. Here, $|0$ $\rangle$ represents the individual qubit state of a trapped ion whereas $|0\rangle_m$ with the subscript m denotes the motional ground state for a motional mode m of a group 106 of trapped ions.

An individual qubit state of each trapped ion may be manipulated by, for example, a mode-locked laser at 355 nanometers (nm) via the excited $^2P_{1/2}$ level (denoted as $|e\rangle$). As shown in FIG. 3, a laser beam from the laser may be split into a pair of non-copropagating laser beams (a first laser beam with frequency $\omega_1$ and a second laser beam with frequency $\omega_2$) in the Raman configuration, and detuned by a one-photon transition detuning frequency $\Delta=\omega_1-\omega_{0e}$ with respect to the transition frequency $\omega_{0e}$ between $|0\rangle$ and $|e\rangle$, as illustrated in FIG. 3. A two-photon transition detuning frequency $\delta$ includes adjusting the amount of energy that is provided to the trapped ion by the first and second laser beams, which when combined is used to cause the trapped ion to transfer between the hyperfine states $|0\rangle$ and $|1\rangle$. When the one-photon transition detuning frequency $\Delta$ is much larger than a two-photon transition detuning frequency (also referred to simply as "detuning frequency") $\delta=\omega_1-\omega_2-\omega_{01}$ (hereinafter denoted as $\pm\mu$, $\mu$ being a positive value), single-photon Rabi frequencies $\Omega_{0e}(t)$ and $\Omega_{1e}(t)$ (which are time-dependent, and are determined by amplitudes and phases of the first and second laser beams), at which Rabi flopping between states $|0\rangle$ and $|1\rangle$ and between states $|1\rangle$ and $|e\rangle$ respectively occur, and a spontaneous emission rate from the excited state $|e\rangle$, Rabi flopping between the two hyperfine states $|0\rangle$ and $|1\rangle$ (referred to as a "carrier transition") is induced at the two-photon Rabi frequency $\Omega(t)$. The two-photon Rabi frequency $\Omega(t)$ has an intensity (i.e., absolute value of amplitude) that is proportional to $\Omega_{0e}\Omega_{1e}/2\Delta$, where $\Omega_{0e}$ and $\Omega_{1e}$ are the single-photon Rabi frequencies due to the first and second laser beams, respectively. Hereinafter, this set of non-copropagating laser beams in the Raman configuration to manipulate internal hyperfine states of qubits (qubit states) may be referred to as a "composite pulse" or simply as a "pulse," and the resulting time-dependent pattern of the two-photon Rabi frequency $\Omega(t)$ may be referred to as an "amplitude" of a pulse or simply as a "pulse," which are illustrated and further described below. The detuning frequency $\delta=\omega_1-\geq_2-\omega_{01}$ may be referred to as detuning frequency of the composite pulse or detuning frequency of the pulse. The amplitude of the two-photon Rabi frequency $\omega(t)$, which is determined by amplitudes of the first and second laser beams, may be referred to as an "amplitude" of the composite pulse.

It should be noted that the particular atomic species used in the discussion provided herein is just one example of atomic species which have stable and well-defined two-level energy structures when ionized and an excited state that is optically accessible, and thus is not intended to limit the possible configurations, specifications, or the like of an ion trap quantum computer according to the present disclosure. For example, other ion species include alkaline earth metal ions ($Be^+$, $Ca^+$, $Sr^+$, $Mg^+$, and $Ba^+$) or transition metal ions ($Zn^+$, $Hg^+$, $Cd^+$).

Figure 4:
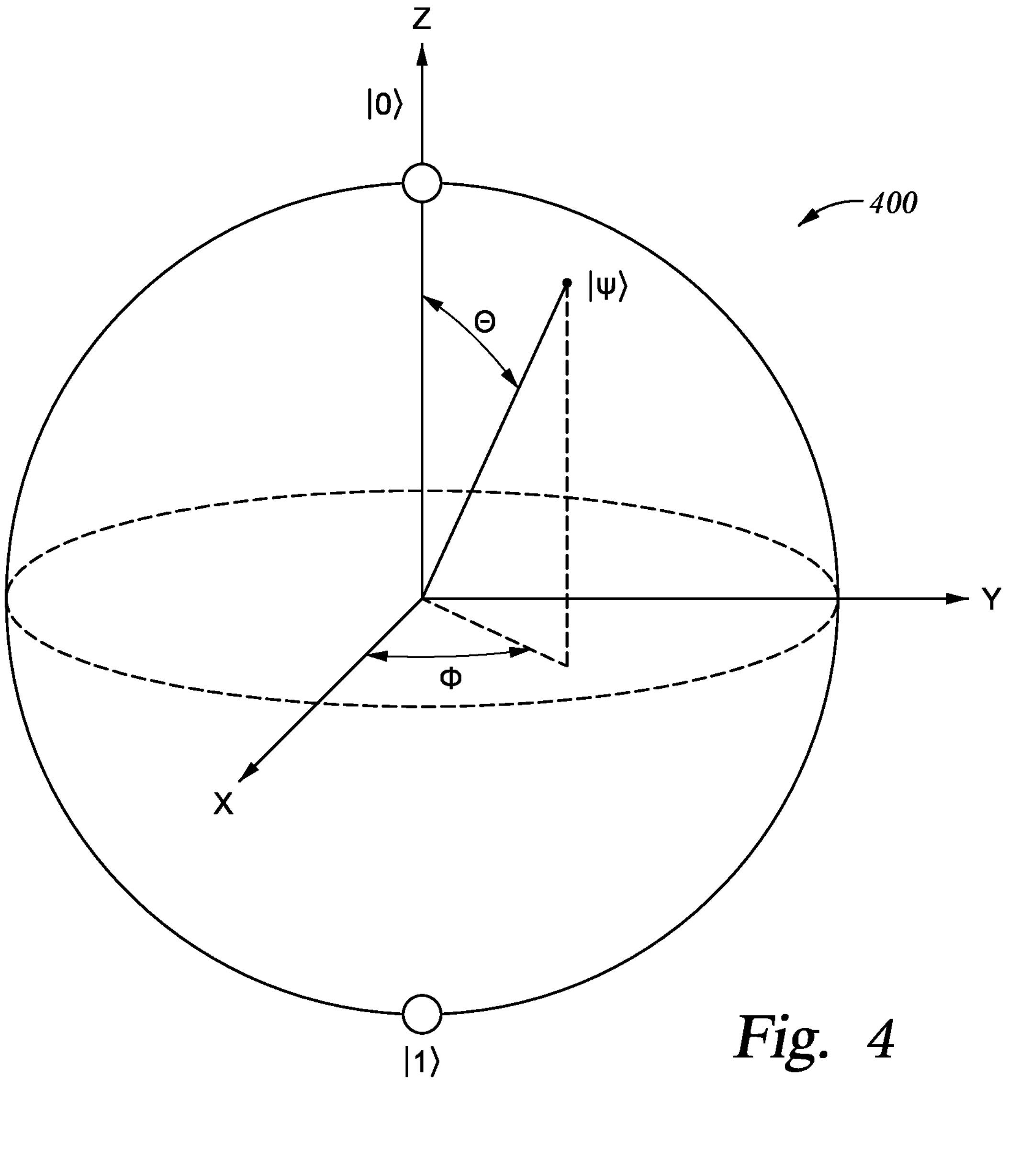
FIG. 4 depicts a qubit state of an ion represented as a point on a surface of the Bloch sphere.

FIG. 4 is provided to help visualize a qubit state of an ion is represented as a point on a surface of the Bloch sphere 400 with an azimuthal angle $\phi$ and a polar angle $\theta$. Application of the composite pulse as described above, causes Rabi flopping between the qubit state $|0\rangle$ (represented as the north pole of the Bloch sphere) and $|1\rangle$ (the south pole of the Bloch sphere) to occur. Adjusting time duration and amplitudes of the composite pulse flips the qubit state from $|0\rangle$ to $|1\rangle$ (i.e., from the north pole to the south pole of the Bloch sphere), or the qubit state from 1) to $|0\rangle$ (i.e., from the south pole to the north pole of the Bloch sphere). This application of the composite pulse is referred to as a "$\pi$-pulse". Further, by adjusting time duration and amplitudes of the composite pulse, the qubit state $|0\rangle$ may be transformed to a superposition state $|0\rangle+|1\rangle$, where the two-qubit states $|0\rangle$ and $|1\rangle$ are added and equally-weighted in-phase (a normalization factor of the superposition state is omitted hereinafter for convenience) and the qubit state $|1\rangle$ to a superposition state $|0\rangle-|1\rangle$, where the two-qubit states $|0\rangle$ and $|1\rangle$ are added equally-weighted but out of phase. This application of the composite pulse is referred to as a "$\pi/2$-pulse". More generally, a superposition of the two-qubits states $|0\rangle$ and $|1\rangle$ that are added and equally-weighted is represented by a point that lies on the equator of the Bloch sphere. For example, the superposition states $|0\rangle\pm|1\rangle$ correspond to points on the equator with the azimuthal angle $\phi$ being zero and $\pi$, respectively. The superposition states that correspond to points on the equator with the azimuthal angle $\phi$ are denoted as $|0\rangle+e^{i\phi}|1\rangle$ (e.g., $|0\rangle\pm|1\rangle$ for $\phi\pm\pi/2$). Transformation between two points on the equator (i.e., a rotation about the Z-axis on the Bloch sphere) can be implemented by shifting phases of the composite pulse.

Entanglement Formation

Figure 5A:
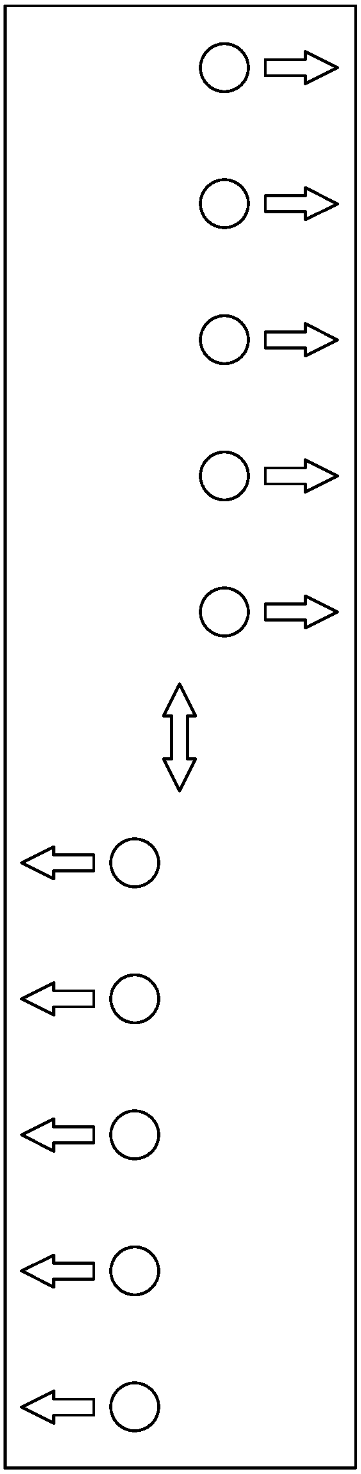
FIGS. 5A, 5B, and 5C depict a few schematic collective transverse motional mode structures of a group of five trapped ions.
Figure 5B:
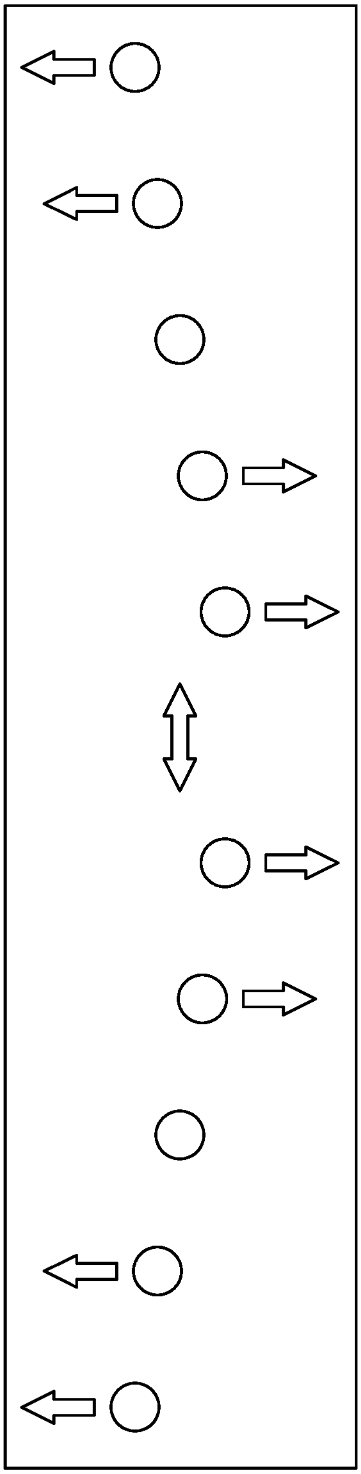
Figure 5C:
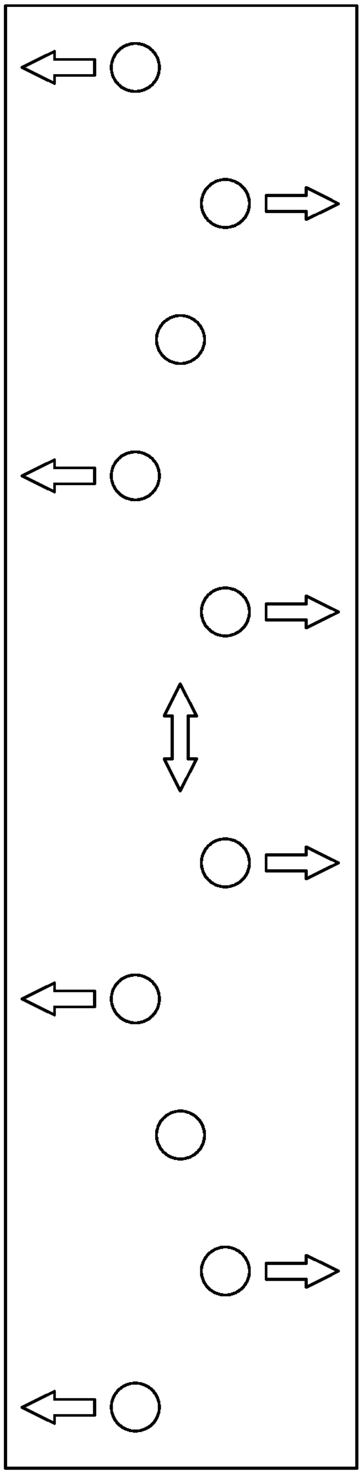

FIGS. 5A, 5B, and 5C depict a few schematic structures of collective transverse motional modes (also referred to simply as "motional mode structures") of a group 106 of five trapped ions, for example. Here, the confining potential due to a static voltage Vs applied to the end-cap electrodes 210 and 212 is weaker compared to the confining potential in the radial direction. The collective motional modes of the group 106 of trapped ions in the transverse direction are determined by the Coulomb interaction between the trapped ions combined with the confining potentials generated by the ion trap 200. The trapped ions undergo collective transversal motions (referred to as "collective transverse motional modes," "collective motional modes," or simply "motional modes"), where each mode has a distinct energy (or equivalently, a frequency) associated with it. A motional mode having the m-th lowest energy is hereinafter referred to as $|n_{ph}\rangle_m$, where $n_{ph}$ denotes the number of motional quanta (in units of energy excitation, referred to as phonons) in the motional mode, and the number of motional modes M in a given transverse direction is equal to the number of trapped ions in the group 106. FIGS. 5A-5C schematically illustrates examples of different types of collective transverse motional modes that may be experienced by five trapped ions that are positioned in a group 106. FIG. 5A is a schematic view of a common motional mode $|n_{ph}\rangle_M$ having the highest energy, where M is the number of motional modes. In the common motional mode $|n\rangle_M$, all ions oscillate in phase in the transverse direction. FIG. 5B is a schematic view of a tilt motional mode $|n_{ph}\rangle_{M-1}$ which has the second highest energy. In the tilt motional mode, ions on opposite ends move out of phase in the transverse direction (i.e., in opposite directions). FIG. 5C is a schematic view of a higher-order motional mode $|n_{ph}\rangle_{M-3}$ which has a lower energy than that of the tilt motional mode $|n_{ph}\rangle_{M-1}$, and in which the ions move in a more complicated mode pattern.

It should be noted that the particular configuration described above is just one among several possible examples of a trap for confining ions according to the present disclosure and does not limit the possible configurations, specifications, or the like according to the present disclosure. For example, the geometry of the electrodes is not limited to the hyperbolic electrodes described above. In other examples, a trap that generates an effective electric field causing the motion of the ions in the radial direction as harmonic oscillations may be a multi-layer trap in which several electrode layers are stacked and an RF voltage is applied to two diagonally opposite electrodes, or a surface trap in which all electrodes are located in a single plane on a chip. Furthermore, a trap may be divided into multiple segments, adjacent pairs of which may be linked by shuttling one or more ions, or coupled by photon interconnects. A trap may also be an array of individual trapping regions arranged closely to each other on a micro-fabricated ion trap chip, such as the one described above. In some embodiments, the quadrupole potential has a spatially varying DC component in addition to the RF component described above.

Figure 6A:
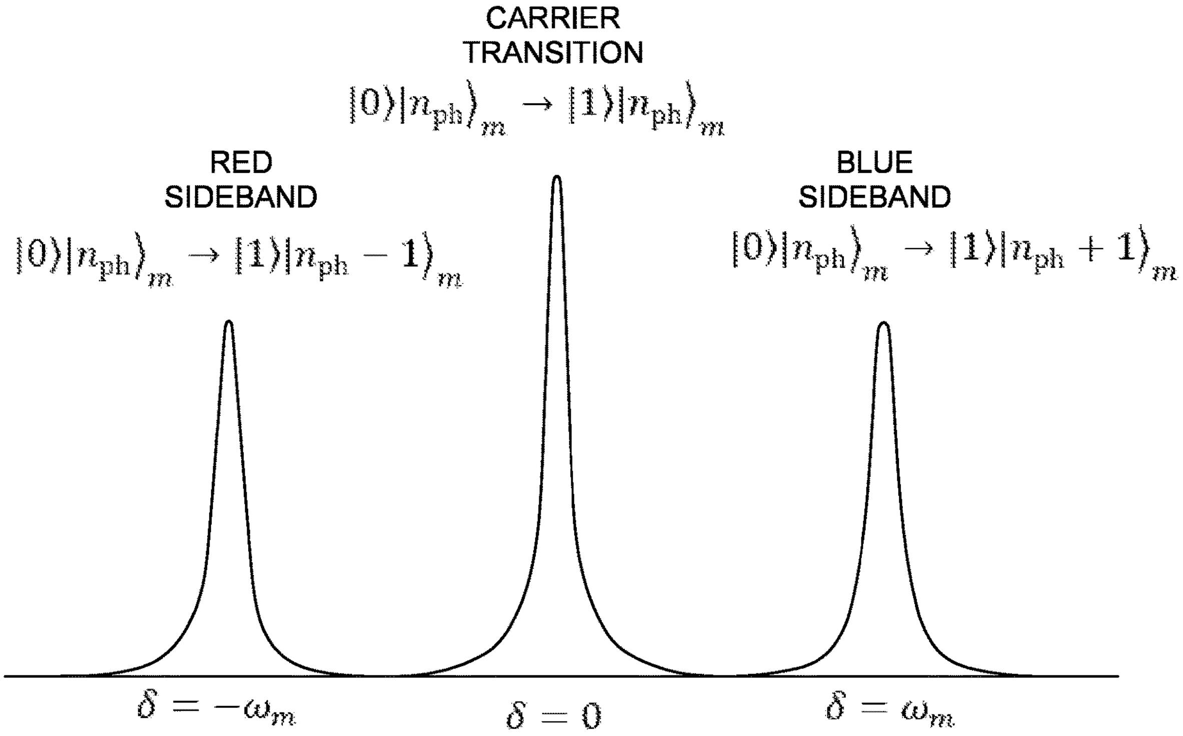
FIGS. 6A and 6B depict schematic views of motional sideband spectrum of each ion and a motional mode according to one embodiment.
Figure 6B:
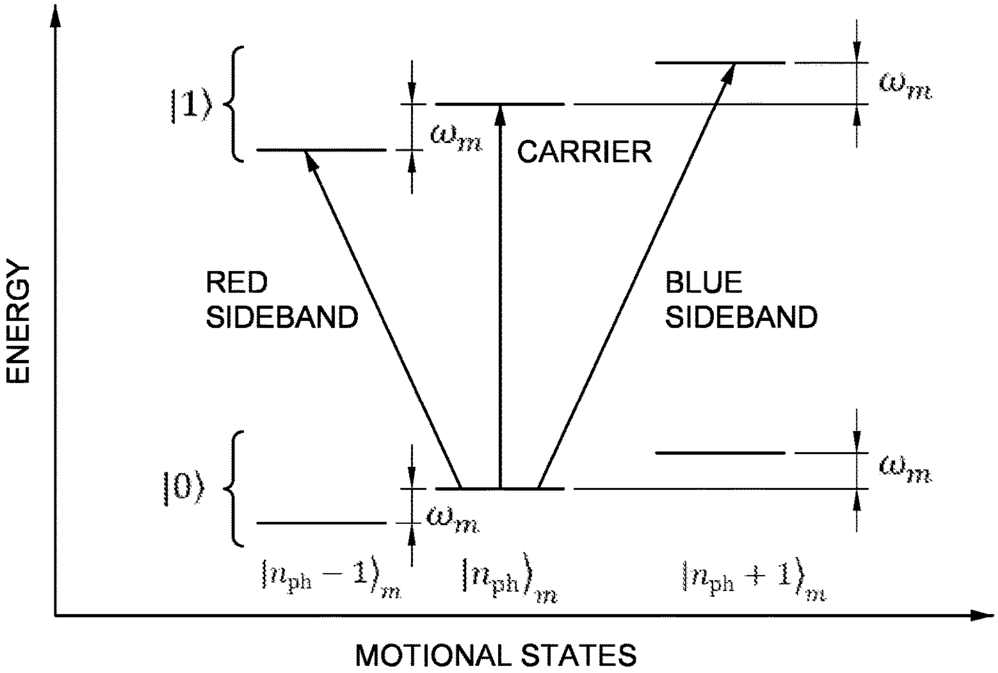

In an ion trap quantum computer, the motional modes may act as a data bus to mediate entanglement between two qubits and this entanglement is used to perform an XX gate operation. That is, each of the two qubits is entangled with the motional modes, and then the entanglement is transferred to an entanglement between the two qubits by using motional sideband excitations, as described below. FIGS. 6A and 6B schematically depict views of a motional sideband spectrum for an ion in the group 106 in a motional mode $|n_{ph}\rangle_M$ having frequency $\omega_m$ according to one embodiment. As illustrated in FIG. 6B, when the detuning frequency of the composite pulse is zero (i.e., a frequency difference between the first and second laser beams is tuned to the carrier frequency, $\delta=\omega_1-\omega_2-\omega_{01}=0$), simple Rabi flopping between the qubit states $|0\rangle$ and $-1\rangle$ (carrier transition) occurs. When the detuning frequency of the composite pulse is positive (i.e., the frequency difference between the first and second laser beams is tuned higher than the carrier frequency, $\delta=\omega_1-\omega_2-\omega_{01}=\mu>0$, referred to as a blue sideband), Rabi flopping between combined qubit-motional states $|0\rangle|n_{ph}\rangle_m$ and $|1\rangle n_{ph}+1\rangle$ occurs (i.e., a transition from the m-th motional mode with n-phonon excitations denoted by $|n_{ph}\rangle_m$ to the m-th motional mode with $(n_{ph}+1)$-phonon excitations denoted by $|n_{ph}+1\rangle_m$ occurs when the qubit state $|0\rangle$ flips to $|1\rangle$). When the detuning frequency of the composite pulse is negative (i.e., the frequency difference between the first and second laser beams is tuned lower than the carrier frequency by the frequency $\omega_m$ of the motional mode $|n_{ph}\rangle_m$, $\delta=\omega_1-\omega_2-\omega_{01}=-\mu<0$, referred to as a red sideband), Rabi flopping between combined qubit-motional states $|0\rangle|n_{ph}\rangle_m$ and $|1\rangle n_{ph}-1\rangle_m$ occurs (i.e., a transition from the motional mode $|n_{ph}\rangle_m$ to the motional mode $|n_{ph}-1\rangle_m$ with one less phonon excitations occurs when the qubit state $|0\rangle$ flips to $|1\rangle$). A $\pi/2$-pulse on the blue sideband applied to a qubit transforms the combined qubit-motional state $|0\rangle|n_{ph}\rangle$ into a superposition of $|0\rangle n_{ph}\rangle_m$ and $|1\rangle|n_{ph}+1\rangle_m$. A $\pi/2$-pulse on the red sideband applied to a qubit transforms the combined qubit-motional state $|0\rangle n_{ph}\rangle_m$ into a superposition of $|0\rangle n_{ph}\rangle_m$ and $|1\rangle|n_{ph}-1\rangle_m$. When the two-photon Rabi frequency $\Omega(t)$ is smaller as compared to the detuning frequency $\delta=\omega_1-\omega_2-\omega_{01}=\pm\mu$, the blue sideband transition or the red sideband transition may be selectively driven. Thus, a qubit can be entangled with a desired motional mode by applying the right type of pulse, such as a $\pi/2$-pulse, which can be subsequently entangled with another qubit, leading to an entanglement between the two-qubits that is needed to perform an XX-gate operation in an ion trap quantum computer.

By controlling and/or directing transformations of the combined qubit-motional states as described above, an XX-gate operation may be performed on two-qubits (i-th and j-th qubits). In general, the XX-gate operation (with maximal entanglement) respectively transforms two-qubit states $|0\rangle_i|0\rangle_j$, $|0\rangle_i|1\rangle_j$, $|1\rangle_i|0\rangle_j$, and $|1\rangle_i|1\rangle_j$ as follows:

$$|0\rangle_i|0\rangle_j \rightarrow |0\rangle_i|0\rangle_j - i|1\rangle_j|1\rangle_j$$

$$|0\rangle_i|1\rangle_j \rightarrow |0\rangle_i|1\rangle_j - i|1\rangle_i|0\rangle_j$$

$$|1\rangle_i|0\rangle_j \rightarrow -i|0\rangle_i|1\rangle_j + |1\rangle_i|0\rangle_j$$

$$|1\rangle_i|1\rangle_j \rightarrow -i|0\rangle_i|0\rangle_j + |1\rangle_i|1\rangle_j.$$

For example, when the two-qubits (i-th and j-th qubits) are both initially in the hyperfine ground state $|0\rangle$ (denoted as $|0\rangle_i|0\rangle_j$) and subsequently a $\pi/2$-pulse on the blue sideband is applied to the i-th qubit, the combined state of the i-th qubit and the motional mode $|0\rangle_i|n_{ph}\rangle_m$ is transformed into a superposition of $|0\rangle_i|n_{ph}\rangle_m$ and $|1\rangle_i|n_{ph}+1\rangle_m$, and thus the combined state of the two-qubits and the motional mode is transformed into a superposition of $|0\rangle_i|0\rangle_j|n_{ph}\rangle_m$ and $|1\rangle_i|0\rangle_j|n_{ph}+1\rangle_m$. When a $\pi/2$-pulse on the red sideband is applied to the j-th qubit, the combined state of the j-th qubit and the motional mode $|0\rangle_j|n_{ph}\rangle_m$ is transformed to a superposition of $|0\rangle_j|n_{ph}\rangle_m$ and $|1\rangle_j|n_{ph}-1\rangle_m$ and the combined state $|0\rangle_j|n_{ph}+1\rangle_m$ is transformed into a superposition of $|0\rangle_j|n_{ph}+1\rangle_m$ and $|1\rangle_j|n_{ph}\rangle_m$.

Thus, applications of a $\pi/2$-pulse on the blue sideband on the i-th qubit and a $\pi/2$-pulse on the red sideband on the j-th qubit may transform the combined state of the two qubits and the motional mode $|0\rangle_m|0\rangle_j|n_{ph}\rangle_m$ into a superposition of $|0\rangle_i|0\rangle_j|n_{ph}\rangle_m$ and $|1\rangle_i|1\rangle_j|n_{ph}\rangle_m$, the two qubits now being in an entangled state. For those of ordinary skill in the art, it should be clear that two-qubit states that are entangled with motional mode having a different number of phonon excitations from the initial number of phonon excitations $n_{ph}$ (i.e., $|1\rangle_i|0\rangle_j|n_{ph}+1\rangle_m$ and $|0\rangle_i|1\rangle_j|n_{ph}-1\rangle_m$) can be removed by a sufficiently complex pulse sequence, and thus the combined state of the two qubits and the motional mode after the XX-gate operation may be considered disentangled as the initial number of phonon excitations $n_{ph}$ in the m-th motional mode stays unchanged at the end of the XX-gate operation. Thus, qubit states before and after the XX-gate operation will be described below generally without including the motional modes.

More generally, the combined state of i-th and j-th qubits transformed by the application of pulses on the sidebands for duration T (referred to as a "gate duration"), having amplitudes $\Omega^{(i)}$ and $\Omega^{(j)}$ and detuning frequency $\mu$, can be described in terms of an entangling interaction $\chi^{(i,j)}(\tau)$ as follows:

$$|0\rangle_i|0\rangle_j \rightarrow \cos(2\chi^{(i,j)}(\tau))|0\rangle_i|0\rangle_j - i\sin(2\chi^{(i,j)}(\tau))|1\rangle_i|1\rangle_j$$

$$|0\rangle_i|1\rangle_j \rightarrow \cos(2\chi^{(i,j)}(\tau))|0\rangle_i|1\rangle_j - i\sin(2\chi^{(i,j)}(\tau))|1\rangle_i|0\rangle_j$$

$$|1\rangle_i|0\rangle_j \rightarrow -i\sin(2\chi^{(i,j)}(\tau))|0\rangle_i|1\rangle_j + \cos(2\chi^{(i,j)}(\tau))|1\rangle_i|0\rangle_j$$

$$|1\rangle_i|1\rangle_j \rightarrow \cos(2\chi^{(i,j)}(\tau))|0\rangle_i|0\rangle_j + \cos(2\chi^{(i,j)}(\tau))|1\rangle_i|1\rangle_j$$

where, $$\chi^{(i,j)}(\tau) = -4\sum_{m=1}^{M}\eta_m^{(i)}\eta_m^{(j)}\int_0^{\tau}dt_2\int_0^{t_2}dt_1\Omega^{(i)}(t_2)\Omega^{(j)}(t_1)\cos(\mu t_2)\cos(\mu t_1)\sin[\omega_m(t_2-t_1)]$$

and $$\eta_m^{(i)}$$

is the Lamb-Dicke parameter that quantifies the coupling strength between the i-th ion and the m-th motional mode having the frequency $\omega_m$, and M is the number of the motional modes (equal to the number N of ions in the group 106).

The entanglement interaction between two qubits described above can be used to perform an XX-gate operation. The XX-gate operation (XX gate) along with single-qubit operations (R gates) forms a set of gates {R, XX} that can be used to build a quantum computer that is configured to perform desired computational processes. Among several known sets of logic gates by which any quantum algorithm can be decomposed, a set of logic gates, commonly denoted as {R, XX}, is native to a quantum computing system of trapped ions described herein. Here, the R gate corresponds to manipulation of individual qubit states of trapped ions, and the XX gate (also referred to as an "entangling gate") corresponds to manipulation of the entanglement of two trapped ions.

To perform an XX-gate operation between i-th and j-th qubits, pulses that satisfy the condition $\chi^{(i,j)}(\tau)=\theta^{(i,j)}$ ($0<\theta^{(i,j)}\leq\pi/8$) (i.e., the entangling interaction $\chi^{(i,j)}(\tau)$ has a desired value $\theta^{(i,j)}$, referred to as condition for a non-zero entanglement interaction) are constructed and applied to the i-th and the j-th qubits. The transformations of the combined state of the i-th and the j-th qubits described above corresponds to the XX-gate operation with maximal entanglement when $\theta^{(i,j)}=\pi/8$-Amplitudes $\Omega^{(i)}(t)$ and $\Omega^{(j)}(t)$ of the pulses to be applied to the i-th and the j-th qubits are control parameters that can be adjusted to ensure a non-zero tunable entanglement of the i-th and the j-th qubits to perform a desired XX gate operation on i-th and j-th qubits.

Hybrid Quantum-Classical Computing System

In a hybrid quantum-classical computing system, a quantum computer can generally be used as a domain-specific accelerator that may be able to accelerate certain computational tasks beyond the reach of what classical computers can do. As mentioned above, the terms "quantum computer" and "quantum processor" can be used interchangeably. Examples of such computational tasks include the Ewald summation in molecular dynamics (MD) simulations of a physical system having particles that exert force on each other via short-range and long-range interactions. Examples of such physical systems include ionic fluids, DNA strands, proteins, (poly) electrolyte solutions, colloids, or molecular models with partial charge. The dynamics of such a physical system is dictated by the energetics of the physical system and the primary contribution to the energies of the physical system comes from the long-range interaction (e.g., Coulomb interaction) among particles.

In the MD simulations, a bulk material that is to be analyzed based on simulations is typically modeled as an infinite system in which a finite system (referred to as a "primitive cell") of N interacting particles is duplicated with periodic boundary conditions imposed. The N interacting particles may have long-range interaction (e.g., Coulomb interaction) with one another. It is widely accepted that truncating the long-range interactions introduces non-physical artifacts in calculating inter-particle interaction energies. Thus, calculation of the inter-particle interaction energies would require summation of the long-range interactions of all pairs among N interacting particles, leading to an increase in the computational complexity as $O(N^2)$ if the long-range interactions are directly summed. The Ewald summation method allows efficient calculation of inter-particle interaction energies due to the long-range interactions with an increase in the computational complexity as $O(N^{3/2})$ and has become a standard method to efficiently simulate a group of particles having long-range interaction.

In the embodiments described herein, a method of performing MD simulations using the Ewald summation method by a hybrid quantum-classical computing system, referred to as the "quantum-enhanced Ewald (QEE) summation method," is provided. The QEE summation method has an overall computational complexity of $O(N^{5/4}(\log N)^3)$ as compared the conventional Ewald summation method $O(N^{3/2})$.

It should be noted that the example embodiments described herein are just some possible examples of a hybrid quantum-classical computing system according to the present disclosure and do not limit the possible configurations, specifications, or the like of hybrid quantum-classical computer systems according to the present disclosure.

For example, a hybrid quantum-classical computing system according to the present disclosure can be applied to other types of computer simulations or image/signal processing in which cyclic shift operations and phase kickback operations contributes to the computational complexity and can be accelerated by use of a quantum processor.

It is considered herein N interacting, classical particles, evolving according to the laws of classical physics. Each particle has a well-defined position and momentum at any time during the simulation.

A sum of the inter-particle interaction energies $U^{coul}$ due to pairwise interactions, e.g., Coulomb interaction, is given by $$U^{coul}=\frac{1}{2}\sum\nolimits_{t\in\mathbb{Z}^3}\sum\nolimits_{i,j=0}^{N-1}\frac{q_iq_j}{|r_i-r_j+tL|}$$

where i and j denote the particle indices (i=0, 1, 2, . . . , N−1, j=0, 1, 2, . . . , N−1) in a primitive cell of a cubic shape with an edge length of L, $$r^{(j)}=\left(r_x^{(j)},r_y^{(j)},r_z^{(j)}\right)$$

denote the positions of the respective particles j, $q_l$ and $q_j$ denote the charges of the respective particles i and j, and $t=(t_x,t_y,t_z)$ denote a vector of integer indices for each duplicated primitive cell.

In the Ewald summation method, a charge distribution $\rho(r)$ at a position r in the primitive cell, for example, a sum of N point charges (each of which is described by a Dirac delta function $\delta(r-r^{(j)})$), $$\rho(r)=\sum\nolimits_{j=0}^{N-1}q_j\delta\left(r-r^{(j)}\right),$$

is replaced by a sum of a screened charge distribution $\rho^s(r)$(i.e., each point charge is smeared) and a cancelling charge distribution $\rho^L(r)$ to compensate for the screened charge distribution $\rho^S(r)$, given by $$\rho(r)=\rho^S(r)+\rho^L(r),$$

where $$\rho^s(r)=\sum_{j=0}^{N-1} q_j\left(\delta\left(r-r^{(j)}\right)-W_\alpha\left(r-r^{(j)}\right)\right),$$

with a screening function $W_\alpha(r-r^{(j)})$. The screening function $W_\alpha(r-r^{(j)})$ may be, for example, a Gaussian screen function, $$W_\alpha\left(r-r^{(j)}\right)=\left(\frac{\alpha}{\sqrt{\pi}}\right)^3 \exp\left(-\alpha^2|r-r^{(j)}|^2\right),$$

where the parameter $\alpha>0$ defines a width of the screening. The screened charge distribution $\rho^S(r)$ screens the interaction between point charges that are separated more than the parameter $\alpha$ (that is, the inter-particle interaction due to the screened charge distribution $\rho^S(r)$ is short-range) and subsequently leads to a rapid convergence in calculating inter-particle interaction energies due to the screened charge distribution $\rho^S(r)$. To compensate a difference between the contribution to the inter-particle interaction energies due to the screened charge distribution $\rho^S(r)$ and that of the (original) charge distribution $\rho(r)$, the cancelling charge distribution $\rho^L(r)$ having the same charge sign as the point charge, $$\rho^L(r)=\sum_{j=0}^{N-1} q_j W_\alpha\left(r-r^{(j)}\right),$$

is added. The inter-particle interaction due to the cancelling charge distribution $\rho^L(r)$ is long range, and the contribution to the inter-particle interaction energies due to the cancelling charge distribution $\rho^L(r)$ is typically calculated in the reciprocal space.

Thus, the inter-particle interaction energies $U^{coul}$ is a sum of short-range inter-particle interaction energies $U^{short}$ due to the screened charge distribution $\rho^S(r)$, $$U^{short}=\frac{1}{2}\sum_{t\in\mathbb{Z}^3}\sum_{i,j=0}^{N-1}\frac{q_i q_j}{\left|r^{(i)}-r^{(j)}+tL\right|}\operatorname{erfc}\left(\alpha\left|r^{(i)}-r^{(j)}+tL\right|\right),$$

long-range inter-particle interaction energies $U^{long}$ $$U^{long}=\frac{2\pi}{L^3}\sum_{k=0}^{K}\frac{1}{k^2}\exp\left(-\frac{k^2}{4\alpha^2}\right)|\hat{\rho}^q(k)|^2,$$

and self-energies $U^{self}$, $$U^{self}=\frac{\alpha}{\pi^{1/2}}\sum_{i=0}^{N-1} q_i^2.$$

In the long-range interaction energies $U^{long}$, the Fourier transform of the charge density, $$\hat{\rho}^q(k)=\sum_{j=0}^{N-1} q_j e^{ik\cdot r^{(j)}},$$

is the electric form factor well known in the art and also referred to as "structure factor S(k)" in the context of crystallography. The reciprocal vectors k is defined as $k=(k_x, k_y, k_z)=(2\pi n_x/L, 2\pi n_y/L, 2\pi n_z/L)$, where $n_x$, $n_y$, and $n_z$ are integers, and K is the maximal k. The maximal k to be considered, i.e., K, is typically chosen to ensure the simulation is accurate to within the desired upper-bound error $\delta$.

The computation of the electric form factor $\hat{\rho}^q(k)$ in the long-range interaction energies $U^{long}$ involves Fourier transform and is known to be the speed-limiting factor in the calculation of the long-range inter-particle interaction energies $U^{long}$. In the QEE method, the computation of the electric form factor $\hat{\rho}^q(k)$ is offloaded to the quantum processor to improve an overall computational complexity as discussed below.

Figure 7:
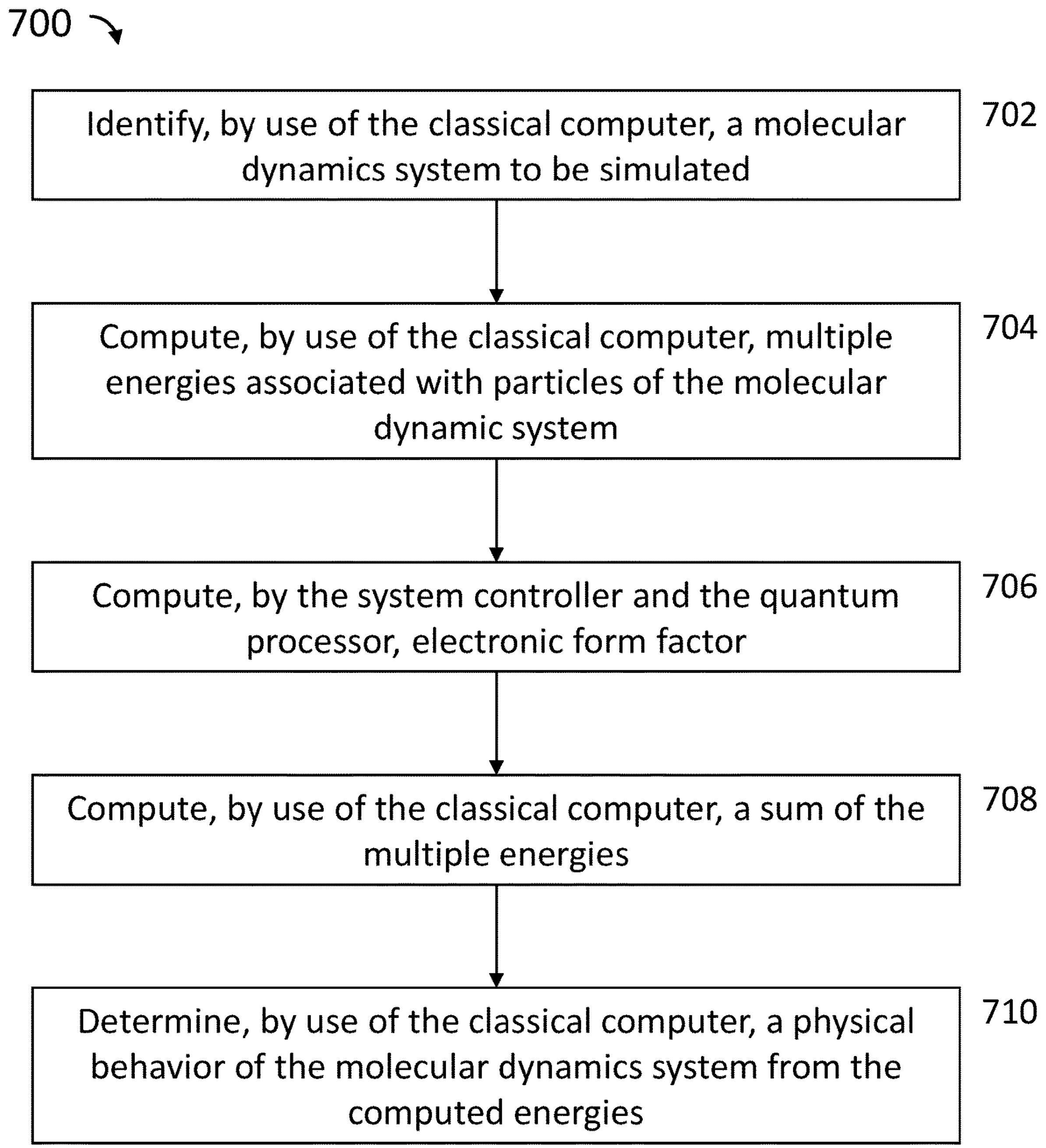
FIG. 7 depicts a flowchart illustrating a method 700 of performing computation using a hybrid quantum-classical computing system comprising a classical computer and a quantum processor.

FIG. 7 depicts a flowchart illustrating a method 700 of performing one or more computations using a hybrid quantum-classical computing system comprising a classical computer and a quantum processor.

In block 702, by the classical computer 102, a molecular dynamics system, such as a group of interacting particles, to be simulated is identified, for example, by use of a user interface, such as graphics processing unit (GPU), of the classical computer 102, or retrieved from the memory of the classical computer 102, and information regarding the molecular dynamics system is retrieved from the memory of the classical computer 102.

Specifically, a size of the primitive cell (e.g. edge lengths $L_x$, $L_y$, and $L_z$), the number of interacting particles N in the primitive cell, positions $r^{(j)}$(j=0, 1, . . . , N−1) of the N interacting particles in the primitive cell, a charge distribution $\rho(r)$ at a position r in the primitive cell, a type of inter-particle interactions among the N interacting particles (e.g., Coulomb interaction), a screening function $W_\alpha(r-r^{(j)})$, and the number of qubits F to encode a position $r^{(j)}$ of a charge $q_j$, a desired upper-bound error E in discretizing the position $r^{(j)}$ (e.g., discretizing the edge lengths $L_x$, $L_y$, and $L_z$ into $m_x$, $m_y$, and $m_z$ finite lengths, respectively) are selected and saved in the memory of the classical computer 102.

In block 704, by the classical computer 102, multiple energies associated with the particles of the molecular dynamics system is computed as part of the simulation, based on the Ewald summation method. The computation of the multiple energies is partially offloaded to the quantum processor to be performed in the process in block 706. Specifically, the short-range inter-particle interaction energy $U^{short}$ and the self-energies $U^{self}$ are computed by the conventional computational methods known in the art. The electronic form factor $\hat{\rho}^q(k)$ in the long-range inter-particle interaction energies $U^{long}$ for a reciprocal vector k is computed by the quantum processor in block 706.

In block 706, by the system controller 104 and the quantum processor, the electronic form factor $\hat{\rho}^q(k)$ for the reciprocal vector k selected in block 704 is computed as further discussed below. The computation of the electronic form factor $\hat{\rho}^q(k)$ is repeated until the electronic form factor $\hat{\rho}^q(k)$ for sufficiently many reciprocal vectors k have been computed.

In block 708, by the classical computer 102, a sum of the inter-particle interaction energies $U^{coul}=U^{short}+U^{long}-U^{self}$ is computed. Specifically, the long-range inter-particle interaction energies $U^{long}$ is computed based on the results of block 706, and the sum of the inter-particle interaction energies is computed by adding the short-range inter-particle interaction energies $U^{short}$ and the self-energies $U^{self}$ that have been computed by the classical computer 102 in block 704. The long-range inter-particle interaction energies $U^{long}$ can be calculated by the classical computer 102 using the electric form factor $\hat{\rho}^q(k)$ as $$U^{long}=\frac{2\pi N^{3/2}M^{3/2}}{L^3}\sum_{k=0}^{K}\frac{1}{k^2}\exp\left(-\frac{k^2}{4\alpha^2}\right)|\hat{\rho}^q(k)|^2.$$

In block 710, by the classical computer 102, a physical behavior of the molecular dynamics system is determined from the inter-particle interaction energies computed in block 708. Specifically, by the classical computer 102, the computed sum of the inter-particle interaction energies $U^{coul}=U^{short}+U^{long}-U^{self}$ is output to a user interface, such as graphics processing unit (GPU) of the classical computer 102 and/or saved in the memory of the classical computer 102. For example, the computed sum of the inter-particle interaction energies can be represented in a table or as a graphic representation of the particles on a display coupled to the GPU.

Figure 8:
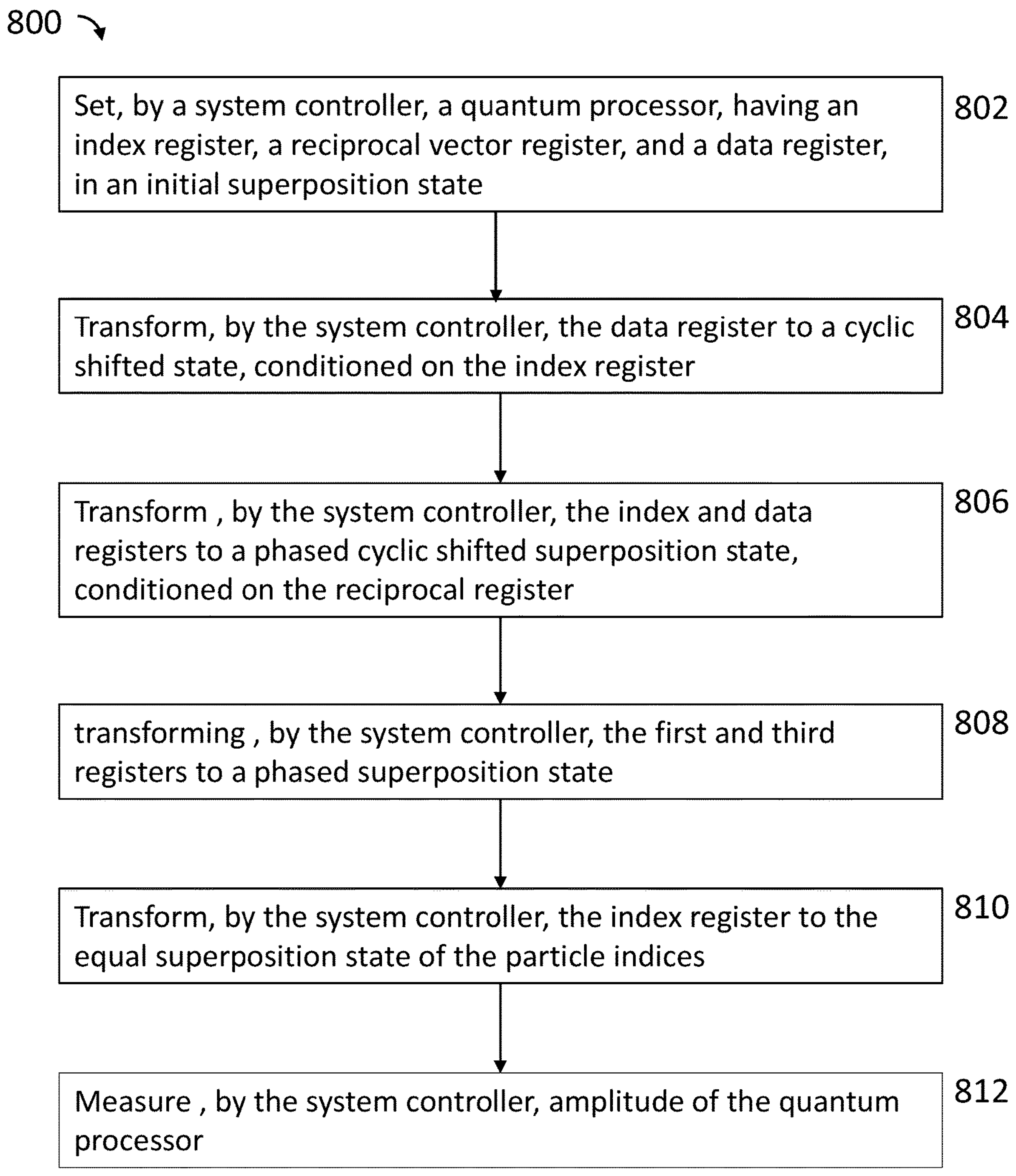
FIG. 8 depicts a flowchart illustrating a method of obtaining energies of a system having interacting particles by molecular dynamics (MD) simulations according to one embodiment.

FIG. 8 depicts a flowchart illustrating a method 800 of computing multiple energies associated with particles of the molecular dynamics system as part of the molecular dynamics (MD) simulations as shown in block 706 above. In this example, the quantum processor is based on the group 106 of trapped ions, in which the two hyperfine states of each of the trapped ions form a qubit. Thus, the trapped ions form the qubits that provide the computing core of the quantum processor or quantum computer.

In block 802, by the system controller 104, the quantum processor (i.e., the group 106 of ions) is set in an initial superposition state $|\psi_0\rangle=|\psi\rangle_{index}|k\rangle\,\psi\rangle_{data}$.

The first register (referred to also as an "index register" hereinafter) formed of $\rceil\log_2 N\lceil$ qubits to encode particle indices j(=0, 1, 2, . . . , N−1) is prepared in an equal superposition state of the particle indices $$|\psi\rangle_{index}=\frac{1}{\sqrt{N}}\sum_{v=0}^{N-1}|v\rangle.$$

The equal superposition state of the particle indices $|\psi\rangle_{index}$ can set by application of a Hadamard operation H to each of the $\rceil\log_2 N\lceil$ qubits of the index register that are prepared in state $|0\rangle$, for example, the hyperfine ground state $|0\rangle$, by optical pumping in an exemplary quantum computer with trapped ions. A Hadamard operation H transforms each qubit from $|0\rangle$ to a super position state $$\frac{|0\rangle+|1\rangle}{\sqrt{2}},$$

and $|1\rangle$ to another superposition state $$\frac{|0\rangle-|1\rangle}{\sqrt{2}},$$

which can be implemented by application a proper combination of single-qubit operations.

$$|0\rangle_{index}\xrightarrow{H}|\psi\rangle_{index}=\frac{1}{\sqrt{N}}\sum_{v=0}^{N-1}|v\rangle.$$

The second register (referred to as a "reciprocal vector register" hereinafter) is formed of $\rangle(\Gamma)$ qubits to encode the reciprocal vector k selected in block 704. The reciprocal vector register can be set by a proper combination of single-qubit operations to the $\rangle(\Gamma)$ qubits of the reciprocal vector register that are all prepared in state $|0\rangle$.

The third register (referred to also as a "data register" hereinafter) is formed of $\rangle(N\Gamma)$ qubits and set in a charge-position encoded state $$|\psi\rangle_{data}=\bigotimes_{j=0}^{N-1}\left(|q_j,r^{(j)}\rangle\right)$$

to encode the charges $q_j$ and the positions $$r^{(j)}=\left(r_x^{(j)},r_y^{(j)},r_z^{(j)}\right)$$

of particles j(=0, 1, 2, . . . , N−1) within a primitive cell having the edge lengths $L_x$, $L_y$, and $L_z$, discretized into sufficiently dense grids. Each block of registers $|r^{(j)}\rangle$ for particles j(=0, 1, 2, . . . , N−1) is a tensor product of the three sub-registers $$|r_x^{(j)}\rangle\otimes|r_y^{(j)}\rangle\otimes|r_z^{(j)}\rangle,$$

where the three sub-registers are formed with $m_x$, $m_y$, and $m_z$ qubits, respectively. The system controller 104 retrieves the positions $$r^{(j)}=\left(r_x^{(j)},r_y^{(j)},r_z^{(j)}\right)$$

and charges $q_i$ from either the (classical) memory of the classical computer 102 or a quantum memory (formed of qubits) of the quantum processor and encode the positions $$r^{(j)}=\left(r_x^{(j)},r_y^{(j)},r_z^{(j)}\right)$$

and the charges $q_j$ into the data register. The charge-position encoded state $|\psi\rangle_{data}$ can be set by application of a proper combination of single-qubit operations and two-qubit operations to the $\rangle(N\Gamma)$ qubits of the data register prepared in state $|0\rangle$.

In block 804, by the system controller 104, the data register in the charge-position encoded state $|\psi\rangle_{data}$ is transformed to a cyclic shifted state $$|\psi\rangle_{data}^{CS,(v)}=\bigotimes_{j=0}^{N-1}\left(|q_{j+v},r^{(j+v)}\rangle\right),$$

based on the index register $|v\rangle$. This operation, referred to as a cyclic shift operation S, transforms the index register in the equal superposition state of particle indices $|\psi\rangle_{index}$ and the data register in the charge-position encoded state $|\psi\rangle_{data}$ to a cyclic shifted superposition state $$|\Psi_{CS}\rangle = \frac{1}{\sqrt{N}}\sum_{v=0}^{N-1}|v\rangle \bigotimes_{j=0}^{N-1} |\psi\rangle_{data}^{CS,(v)},$$

$$|\psi\rangle_{index}|\psi\rangle_{data} \xrightarrow{S} |\Psi_{CS}\rangle = \frac{1}{\sqrt{N}}\sum_{v=0}^{N-1}|v\rangle \bigotimes_{j=0}^{N-1} |\psi\rangle_{data}^{CS,(v)}.$$

The cyclic shift operation S can be implemented by application of a combination of single-qubit gate operations and two-qubit gate operations to the qubits in the index register and the data register by the system controller 104.

In block 806, by the system controller 104, the index register and the data register in the cyclic shifted superposition state $|\Psi_{CS}\rangle$ are transformed to a phased cyclic shifted superposition state $|\Psi_{PCS}\rangle^{(k)}$, based on the reciprocal vector register $|k\rangle$. By this transformation, referred to as a phase-kickback operation, the phase $e^{ik-r}$ that is required to compute the electronic form factor $$\hat{\rho}^q(k) = \sum_{j=0}^{N-1} q_j e^{ik\cdot r^{(j)}}$$

is extracted. The phase-kickback operation can be implemented, using an ancillary register formed of m qubits, $|l\rangle_a$ ($l=0, 1, \ldots, M-1$), as a combination of an arithmetic operator D and an inverse Fourier transform. The arithmetic operator D computes the dot product of the reciprocal vector k and the position r in the ancillary register, $$D|k\rangle|r\rangle|l\rangle_a \rightarrow |k\rangle|r\rangle|l \oplus r\cdot k\rangle\rangle_a.$$

The ancillary register with all qubits prepared in the $|0\rangle$ state, upon the application of the inverse Fourier transform, results in the state of $$\sum_{l=0}^{M-1} e^{2\pi i l/M}|l\rangle_a,$$

where $M=2^m$. By application of the arithmetic operator D and the inverse Fourier transform, a combined state of the registers that encode k and r and the ancillary register, $|k\rangle|r\rangle|0\rangle$, is transformed, to $$e^{ik\cdot r}|k\rangle r\rangle\left(\sum_{l=0}^{M-1} e^{2\pi i l/M}|l\rangle_a\right),$$

in which the phase $e^{ik-r}$ is extracted. Subsequently, the ancillary register is disentangled from the index and data registers by the application of the Fourier transform. The arithmetic operator D can be implemented by a proper combination of single-qubit operations and two-qubit operations to the index, data, and ancillary registers. The inverse Fourier transform can be implemented by a proper combination of single-qubit operations and two-qubit operations to the ancillary qubits. In the example described herein, the charges $q_j$ are either −1 or +1, and thus the phase $$(-1)^{\frac{1-q_j}{2}}$$

equals $q_j$. This phase can be implemented by a π-pulse around the Z-axis (referred to as an operation Z) that is a combination of single-qubit gate operations by the system controller 104. When the charges $q_j$ take values other than either −1 or +1, a combination of suitable single-qubit gate operations is applied to the data register to bring out the charges $q_j$ from the data register to amplitudes of the data register.

Thus, the phase-kick-back operation, applied to the first block (i.e., j=0) of the data register in the cyclic shifted superposition state $|\Psi_{CS}\rangle$, transforms the cyclic shifted superposition state $|\Psi_{CS}\rangle$ to a phased cyclic shifted superposition state $|\Psi_{PCS}\Psi\rangle^{(k)}$, $$|\Psi_{CS}\rangle \rightarrow |\Psi_{PCS}\rangle^{(k)} = \frac{1}{\sqrt{N}}\sum_{v=0}^{N-1} q_v e^{ik\cdot r^{(v)}}|v\rangle \bigotimes_{j=0}^{N-1}\left(\left|q_{j+v}, r^{(j+v)}\right\rangle\right).$$

In block 808, by the system controller 104, the index register and the data registers in the phased cyclic shifted superposition state $|\Psi_{PCS}\rangle\rangle^{(k)}$ are transformed to a phased superposition state $|\Psi_P\rangle\rangle^{(k)}$, $$|\Psi_{PCS}\rangle^{(k)} \rightarrow |\Psi_P\rangle^{(k)} = \frac{1}{\sqrt{N}}\sum_{v=0}^{N-1} q_v e^{ik\cdot r^{(v)}}|v\rangle \bigotimes_{j=0}^{N-1}\left(\left|q_j, r^{(j)}\right\rangle\right).$$

in which the data register now has returned to encode the positions $$r^{(j)} = \left(r_x^{(j)}, r_y^{(j)}, r_z^{(j)}\right)$$

and the charges $q_j$. This transformation corresponds to an inverse of the cyclic shift operation S, which can be implemented by application of a combination of single-qubit gate operations and two-qubit gate operations by the system controller 104 to the index register and the data register.

In block 810, by the system controller 104, the phased superposition state $|\Psi_P\rangle^{(k)}$ is transformed to a final superposition state, $|\Psi_F\rangle^{(k)}$, $$|\Psi_P\rangle^{(k)} \rightarrow |\Psi_F\rangle^{(k)} = \frac{1}{N}\sum_{p=0}^{N-1}\left(\sum_{v=0}^{N-1} q_v e^{ik\cdot r^{(v)}}\right)(-1)^{p.v}|p\rangle \bigotimes_{j=0}^{N-1}\left(\left|q_j, r^{(j)}\right\rangle\right),$$

where p. v denotes the bit-wise inner product of the binary representations of p and v.

This transformation can be performed by application of the Hadamard operation H to each qubit in the index register.

In block 814, by the system controller 104, amplitude $A_F(k)$ of the final superposition state $|\Psi_F\rangle\rangle^{(k)}$ is measured in the state $|0\rangle|k\rangle|\mathbf{0}\rangle$ as $$A_F(k) = \langle 0|\langle k|\langle 0||\Psi_F\rangle\rangle = \frac{1}{N}\left|\sum_{v=0}^{N-1} q_v e^{ik\cdot r^{(v)}}\right| = \frac{1}{N}|\hat{\rho}^q(k)|,$$

which is proportional to the electric form factor $\hat{\rho}^q$ (k) for k included in the long-range inter-particle interaction energies $U^{long}$.

In block 816, the measured amplitudes $A_F(k)$ is returned to the classical computer 102. By the classical computer 102, modulus square of the measured amplitudes $A_F(k)$, $|A_F(k)|^2$, is computed and converted to be recorded for the purpose of computing of the long-range inter-particle interaction energies $U^{long}$. The process returns to block 802 to compute another reciprocal vector k if the modulus square of the measured amplitudes $A_F(k)$, $|A_F(k)|^2$ for sufficiently many reciprocal vectors k have not been computed. Once the computation of the amplitudes $A_F(k)$, $|A_F(k)|^2$ by the method 800 for sufficiently many reciprocal vectors k has been completed, the process proceeds to block 708 in the method 700.

The maximal k to be considered, i.e., K, is typically chosen to ensure the simulation is accurate to within the desired upper-bound error S. Optimizing K with respect to a desired upper-bound error δ in the MD simulation, the number of operations scales as $O(N^{3/2})$ in the classical Ewald summation. In the quantum-classical hybrid approach, when optimizing K with respect to a desired upper-bound error δ, the number of operations scales as $O(N^{5/4}(\log N)^3)$, for a 3 dimensional (3D) system.

The method of obtaining energies of a system having interacting particles by molecular dynamics (MD) simulations described herein provides a computational complexity improvement by use of a quantum processor in the calculation of Ewald summation method over the classical calculation method.

It should be noted that the particular example embodiments described above are just some possible examples of a hybrid quantum-classical computing system according to the present disclosure and do not limit the possible configurations, specifications, or the like of hybrid quantum-classical computing systems according to the present disclosure. For example, the method described herein may be applied to other simulation problems such as simulation of trapped ions in a quantum computer to help design a better quantum computer. Furthermore, a quantum processor within a hybrid quantum-classical computing system is not limited to a group of trapped ions described above. For example, a quantum processor may be a superconducting circuit that includes micrometer-sized loops of superconducting metal interrupted by a number of Josephson junctions, functioning as qubits (referred to as flux qubits). The junction parameters are engineered during fabrication so that a persistent current will flow continuously when an external magnetic flux is applied. As only an integer number of flux quanta are allowed to penetrate in each loop, clockwise or counter-clockwise persistent currents are developed in the loop to compensate (screen or enhance) a non-integer external magnetic flux applied to the loop. The two states corresponding to the clockwise and counter-clockwise persistent currents are the lowest energy states; differ only by the relative quantum phase. Higher energy states correspond to much larger persistent currents, thus are well separated energetically from the lowest two eigenstates. The two lowest eigenstates are used to represent qubit states $|0\rangle$ and $|1\rangle$. An individual qubit state of each qubit device may be manipulated by application of a series of microwave pulses, frequency and duration of which are appropriately adjusted.

While the foregoing is directed to specific embodiments, other and further embodiments may be devised without departing from the basic scope thereof, and the scope thereof is determined by the claims that follow.

The invention claimed is:

1. A method of performing computation using a hybrid quantum-classical computing system comprising a classical computer, a system controller, and a quantum processor, comprising:

identifying, by use of the classical computer, a molecular dynamics system to be simulated;

computing, by use of the classical computer, multiple energies associated with particles of the molecular dynamics system as part of the simulation, based on an Ewald summation method, the computing of the multiple energies comprising partially offloading the computing of the multiple energies to the quantum processor; and outputting, by use of the classical computer, a physical behavior of the molecular dynamics system determined from the computed multiple energies, wherein:

the quantum processor comprises a first register formed of a plurality of qubits, a second register formed of a plurality of qubits, and a third register formed of a plurality of qubits, the multiple energies comprise short-range inter-particle interaction energies, self-energies, and long-range inter-particle interaction energies of the particles of the molecular dynamics system, the computing of the multiple energies further comprises computing the short-range inter-particle interaction energies and the self-energies, the partially offloading of the computing of the multiple energies comprises computing, by the system controller and the quantum processor, an electronic form factor used to compute the long-range inter-particle interaction energies, and the computing of the electronic form factor by the quantum processor comprises:

setting, by the system controller, the quantum processor in an initial state, in which the first register is in an equal superposition state of indices of the particles, the second register encodes a reciprocal vector for which the electronic form factor is computed, and the third register is in a charge-position encoded state to encode charges and positions of the particles of the molecular dynamics system;

transforming, by the system controller, the third register to a cyclic shifted state, based on the first register;

transforming, by the system controller, the first and third registers to a phased cyclic shifted superposition state, based on the second register;

transforming, by the system controller, the first and third registers to a phased superposition state;

transforming, by the system controller, the first register to the equal superposition state of the indices of the particles; and measuring, by the system controller, amplitude of the quantum processor.

2. The method of claim 1, further comprising:

computing a sum of the short-range inter-particle interaction energies, the self-energies, and the long-range inter-particle interaction energies, wherein the long-range inter-particle interaction energies are computed based on the computed electronic form factor.

3. The method of claim 1, wherein the transforming of the third register to the cyclic shifted state comprises applying a cyclic shift operation on the third register, based on the first register.

4. The method of claim 3, wherein the transforming of the first and third registers to the phased superposition state comprises applying an inverse of the cyclic shift operation on the third register, based on the first register.

5. The method of claim 1, wherein the transforming of the first and third registers to the phased cyclic shifted superposition state comprises a phase kick-back operation on a first block of the third register, based on the second register.

6. A hybrid quantum-classical computing system, comprising:

a quantum processor comprising a first register formed of a plurality of qubits, a second register formed of a plurality of qubits, and a third register formed of a plurality of qubits, each qubit comprising a trapped ion having two hyperfine states;

one or more lasers configured to emit a laser beam, which is provided to trapped ions in the quantum processor;

a classical computer configured to perform operations comprising:

identifying, by use of the classical computer, a molecular dynamics system to be simulated;

computing, by use of the classical computer, multiple energies associated with particles of the molecular dynamics system as part of the simulation, based on an Ewald summation method, the computing of the multiple energies comprising partially offloading the computing of the multiple energies to the quantum processor; and outputting, by use of the classical computer, a physical behavior of the molecular dynamics system determined from the computed multiple energies; and a system controller configured to execute a control program to control the one or more lasers to perform operations on the quantum processor based on the offloaded computing of the multiple energies, wherein:

the multiple energies comprise short-range inter-particle interaction energies, self-energies, and long-range inter-particle interaction energies of the particles of the molecular dynamics system, the computing of the multiple energies further comprises computing the short-range inter-particle interaction energies and the self-energies, the partially offloading of the computing of the multiple energies comprises computing, by the system controller and the quantum processor, an electronic form factor used to compute the long-range inter-particle interaction energies, and the computing of the electronic form factor by the quantum processor comprises:

setting, by the system controller, the quantum processor in an initial state, in which the first register is in an equal superposition state of indices of the particles, the second register encodes a reciprocal vector for which the electronic form factor is computed, and the third register is in a charge-position encoded state to encode charges and positions of the particles of the molecular dynamics system;

transforming, by the system controller, the third register to a cyclic shifted state, based on the first register;

transforming, by the system controller, the first and third registers to a phased cyclic shifted superposition state, based on the second register;

transforming, by the system controller, the first and third registers to a phased superposition state;

transforming, by the system controller, the first register to the equal superposition state of the indices of the particles; and measuring, by the system controller, amplitude of the quantum processor.

7. The hybrid quantum-classical computing system of claim 6, wherein the operations further comprise:

computing a sum of the short-range inter-particle interaction energies, the self-energies, and the long-range inter-particle interaction energies, wherein the long-range inter-particle interaction energies are computed based on the computed electronic form factor.

8. The hybrid quantum-classical computing system of claim 6, wherein the transforming of the third register to the cyclic shifted state comprises applying a cyclic shift operation on the third register, based on the first register, and the transforming of the first and third registers to the phased superposition state comprises applying an inverse of the cyclic shift operation on the third register, based on the first register.

9. The hybrid quantum-classical computing system of claim 6, wherein the transforming of the first and third registers to the phased cyclic shifted superposition state comprises a phase kick-back operation on a first block of the third register, based on the second register.

10. A hybrid quantum-classical computing system comprising:

a classical computer;

a quantum processor comprising a first register formed of a plurality of qubits, a second register formed of a plurality of qubits, and a third register formed of a plurality of qubits, each qubit comprising a trapped ion having two hyperfine states;

non-volatile memory having a number of instructions stored therein which, when executed by one or more processors, causes the hybrid quantum-classical computing system to perform operations comprising:

identifying, by use of the classical computer, a molecular dynamics system to be simulated;

computing, by use of the classical computer, multiple energies associated with particles of the molecular dynamics system as part of the simulation, based on an Ewald summation method, the computing of the multiple energies comprising partially offloading the computing of the multiple energies to the quantum processor; and outputting, by use of the classical computer, a physical behavior of the molecular dynamics system determined from the computed multiple energies; and a system controller configured to execute a control program to control one or more lasers to perform operations on the quantum processor based on the offloaded computing of the multiple energies, wherein:

the multiple energies comprise short-range inter-particle interaction energies, self-energies, and long-range inter-particle interaction energies of the particles of the molecular dynamics system;

the computing of the multiple energies further comprises computing the short-range inter-particle interaction energies and the self-energies;

the partially offloading of the computing of the multiple energies comprises computing, by the system controller and the quantum processor, an electronic form factor used to compute the long-range inter-particle interaction energies; and the computing of the electronic form factor by the quantum processor comprises:

setting, by the system controller, the quantum processor in an initial state, in which the first register is in an equal superposition state of indices of the particles, the second register encodes a reciprocal vector for which the electronic form factor is computed, and the third register is in a charge-position encoded state to encode charges and positions of the particles of the molecular dynamics system;

transforming, by the system controller, the third register to a cyclic shifted state, based on the first register;

transforming, by the system controller, the first and third registers to a phased cyclic shifted superposition state, based on the second register;

transforming, by the system controller, the first and third registers to a phased superposition state;

transforming, by the system controller, the first register to the equal superposition state of the indices of the particles; and measuring, by the system controller, amplitude of the quantum processor.

11. The hybrid quantum-classical computing system of claim 10, wherein the operations further comprises:

computing a sum of the short-range inter-particle interaction energies, the self-energies, and the long-range inter-particle interaction energies, wherein the long-range inter-particle interaction energies are computed based on the computed electronic form factor.

12. The hybrid quantum-classical computing system of claim 10, wherein the transforming of the third register to the cyclic shifted state comprises applying a cyclic shift operation on the third register, based on the first register.

13. The hybrid quantum-classical computing system of claim 12, wherein the transforming of the first and third registers to the phased superposition state comprises applying an inverse of the cyclic shift operation on the third register, based on the first register.

14. The hybrid quantum-classical computing system of claim 10, wherein the transforming of the first and third registers to the phased cyclic shifted superposition state comprises a phase kick-back operation on a first block of the third register, based on the second register.

* * * * *